(12) United States Patent
Jeong et al.

(10) Patent No.: US 8,052,902 B2
(45) Date of Patent: Nov. 8, 2011

(54) METHOD OF FABRICATING POLARIZING PLATE

(75) Inventors: Jin-Kwan Jeong, Busan (KR); Bong-Jin Choi, Busan (KR)

(73) Assignee: LG Display Co., Ltd., Seoul (KR)

( * ) Notice: Subject to any disclaimer, the term of this patent is extended or adjusted under 35 U.S.C. 154(b) by 458 days.

(21) Appl. No.: 11/987,275

(22) Filed: Nov. 28, 2007

(65) Prior Publication Data
US 2008/0164627 A1     Jul. 10, 2008

(30) Foreign Application Priority Data

Nov. 28, 2006  (KR) ................ 10-2006-0118585
Dec. 28, 2006  (KR) ................ 10-2006-0136957

(51) Int. Cl.
| | |
|---|---|
| B29D 7/01 | (2006.01) |
| B29D 11/00 | (2006.01) |
| B28B 11/16 | (2006.01) |
| B28B 11/12 | (2006.01) |
| B29C 45/14 | (2006.01) |
| B29C 37/00 | (2006.01) |

(52) U.S. Cl. ........ 264/1.34; 264/1.35; 264/1.6; 264/2.6; 264/145; 264/153; 264/157; 264/160

(58) Field of Classification Search .............. None
See application file for complete search history.

(56) References Cited

U.S. PATENT DOCUMENTS

| | | | | |
|---|---|---|---|---|
| 5,744,204 | A * | 4/1998 | Jester | 428/1.61 |
| 6,520,056 | B1 * | 2/2003 | Nemeth et al. | 83/72 |
| 2003/0176124 | A1 * | 9/2003 | Koike et al. | 442/16 |
| 2003/0217806 | A1 * | 11/2003 | Tait et al. | 156/254 |
| 2005/0081691 | A1 * | 4/2005 | Shteyngarts | 83/171 |

FOREIGN PATENT DOCUMENTS

| | | | |
|---|---|---|---|
| JP | 07325220 A | * | 12/1995 |
| KR | 10-2003-0001244 | | 1/2003 |
| WO | WO 9936248 A2 | * | 7/1999 |

* cited by examiner

*Primary Examiner* — Christina Johnson
*Assistant Examiner* — Benjamin Schiffman
(74) *Attorney, Agent, or Firm* — McKenna Long & Aldridge LLP

(57) ABSTRACT

A method of fabricating a polarizing plate includes: providing a polarizing roll film having transmission axes; and cutting the polarizing roll film with a knife having a plurality of openings each having a rectangular shape to form a plurality of polarizing plates, the plurality of openings parallel to the transmission axes.

4 Claims, 10 Drawing Sheets

METHOD OF FABRICATING POLARIZING PLATE

This application claims the benefit of Korean Patent Applications Nos. 10-2006-0118585, filed on Nov. 28, 2006 and 10-2006-0136957, filed on Dec. 28, 2006, which are hereby incorporated by reference as if fully set forth herein.

BACKGROUND OF THE INVENTION

1. Field of the Invention

The present invention relates to a liquid crystal display (LCD) device, and more particularly, to a method of fabricating a polarizing plate for an LCD device.

2. Discussion of the Related Art

Until recently, display devices have typically used cathode-ray tubes (CRTs). More recently, considerable effort has been expended to research and develop thin film transistor liquid crystal display (TFT-LCD) devices having thin profiles, light-in-weight and have low power consumption as substitutes for CRTs.

Liquid crystal display (LCD) devices use the optical anisotropy and polarization properties of liquid crystal molecules to produce an image. The liquid crystal molecules have long, thin, shapes and have an initial alignment direction including initial pretilt angles. The alignment direction can be controlled by applying an electric field to influence the alignment of the liquid crystal molecules. Due to the optical anisotropy property of liquid crystal, the refraction of incident light depends on the alignment direction of the liquid crystal molecules. Thus, by properly controlling the applied electric field, an image having a desired brightness can be produced.

The LCD devices include first and second substrates spaced apart and facing each other, and a liquid crystal layer interposed between the first and second substrates. Further, a polarizing plate is formed on an outer surface of each of the first and second substrates. A polarization component of light parallel to a transmission axis of the polarizing plate passes through the polarizing plate and the other polarization component of the light is shielded by the polarizing plate. As a result, transmittance of light is determined by the arrangement of the polarization axes of the two polarizing plates and the alignment of the liquid crystal layer.

The polarizing plate includes a polarizing layer and transparent films on both surfaces of the polarizing layer. The polarizing plate is formed by cutting a polarizing roll film into polarizing layers and forming first and second support layers of a cellulose material such as tri-acetate cellulose (TAC), an anti-glare layer and an adhesive layer on each of the polarizing layers. In addition, the polarizing roll film is formed by dyeing a raw film with one of iodine ($I_2$) and dichroic dye.

FIG. 1 is a cross-sectional view showing a polarizing plate according to the related art. In FIG. 1, a polarizing plate 10 includes a polarizing layer 11, a first support layer 13a on one surface of the polarizing layer 10, a second support layer 13b on the other surface of the polarizing layer 11, an anti-glare layer 15 on the first support layer 13a and an adhesive layer 17 on the second support layer 13b. Although not shown in FIG. 1, a hard coating layer for protecting the polarizing plate 10 and a sticking prevention layer for preventing sticking to adjacent layers may be formed on the anti-glare layer 15.

The process of forming the polarizing layer 11 is the subject of significant research and development to obtain a uniform polarization property for a higher display quality. In the process of forming the polarizing layer 11, a raw film (not shown) of large molecules is dyed by dipping in a solution of iodine ($I_2$) or dichroic dye, and the dyed raw film is stretched to arrange the iodine ($I_2$) molecule or the dichroic dye molecule parallel to a stretch direction. For the stretch step, the raw film is wound on a roller (not shown) in a bath of the solution of iodine ($I_2$) or dichroic dye.

FIG. 2 is a plan view showing a transmission axis of a polarizing roll film according to the related art. In FIG. 2, a polarizing roll film 20 has a plurality of polarizing plate areas 11a disposed in central (A), left (B) and right (C) regions. Since the polarizing roll film 20 is stretched and wound, transmission axes 22 of the polarizing roll film 20 are distorted and deformed due to a stress generated in the stretch process. As a result, the transmission axes 22 are not uniformly aligned along a stretch direction. Instead, the polarizing roll film 20 has a deviation in the direction of the transmission axes 22.

The polarizing roll film 20 is cut into polarizing plates 11 (of FIG. 1) along the plurality of polarizing plate areas 11a and polarizing plates 10 (of FIG. 1) are completed by forming the first support layer 13a (of FIG. 1), the anti-glare layer 15 (of FIG. 1), the second support layer 13b (of FIG. 1) and the adhesive layer 17 (of FIG. 1). The plurality of polarizing areas 11a are disposed such that two opposite sides of each polarizing area 11a are parallel to two opposite sides of the polarizing roll film 20. Since the transmission axes 22 of the polarizing roll film 20 are distorted, the polarizing plates 10 (of FIG. 1) have a deviation in the direction of the transmission axes 22. The deviation in the direction of the transmission axes 22 causes a color stain or a decoloration in an LCD device including the polarizing plate 10 (of FIG. 1). Further, the deviation in the direction of the transmission axes 22 causes deterioration of the polarization property, thereby reducing the contrast ratio of an LCD device including the polarizing plate 10 (of FIG. 1).

FIG. 3 is a histogram showing deviation in direction of transmission axes of polarizing plates according to the related art. In FIG. 3, transmission axes of polarizing plates are measured according to central, left and right regions A, B and C (of FIG. 2) of a polarizing roll film 20 (of FIG. 2). The x-axis of the histogram represents an angle between a transmission axis of a polarizing plate and a reference direction and the y-axis of the histogram represents the numbers of polarizing plates having the corresponding angle. The reference direction is determined as a lengthwise direction of the polarizing plates, which is the same as a lengthwise direction of the polarizing roll film 20. As shown in FIG. 3, the polarizing plates in the central region A have the transmission axes of an angle between about −0.075° to about −0.05°. In addition, the polarizing plates in the left region B have the transmission axes of an angle between about −0.3° to about −0.275°, and the polarizing plates in the right region C have the transmission axes of an angle of about 0.075°. As a result, the transmission axes of the polarizing plates have an angle between about −0.3 to about 0.075 with respect to the reference direction, and the polarizing plates have relatively great deviation, a range width of about 0.375°, in the direction of the transmission axes.

Recently, a polarizing plate using a discotic liquid crystal molecule has been researched and developed for improving viewing angle. FIG. 4 is a cross-sectional view showing a polarizing plate using a discotic liquid crystal molecule according to the related art. In FIG. 4, a polarizing plate 30 includes a polarizing layer 31, a first support layer 33a on one surface of the polarizing layer 30, a second support layer 33b on the other surface of the polarizing layer 31, an anti-glare layer 35 on the first support layer 33a and an adhesive layer 37 on the second support layer 33b. Although not shown in FIG. 4, a hard coating layer for protecting the polarizing plate 30 and a sticking prevention layer for preventing stick to adjacent layers may be further formed on the anti-glare layer 35.

The second support layer 33b includes discotic liquid crystal molecules 41 arranged in a hybrid type for improving viewing angle. The second support layer 33b of a tri-acetate cellulose (TAC) including discotic liquid crystal molecules 41 may be referred to as a WA (wide view)-TAC film and function as a retardation film.

The polarizing plate 30 is applied to an LCD device such that the adhesive layer 37 is attached to a liquid crystal panel (not shown). After the polarizing plate 30 is attached to a liquid crystal panel, the polarizing plate 30 may be heated by an environmental heat source such as a backlight unit. When the polarizing plate 30 is heated, the first and second support layers 33a and 33b expand because of heat. On the contrary, since a contractile force is accumulated in the polarizing layer 31 as a tension during the stretch step for the raw film, the polarizing layer 31 contracts with heat. Accordingly, when the polarizing plate 30 is heated, a stress is generated between the polarizing layer 31 and each of the first and second support layers 33a and 33b due to the difference in response to heat. The stress may deteriorate properties of the polarizing plate 30, thereby degrading the display quality of an LCD device.

Specifically, the stress between the polarizing layer 31 and the second support layer 33b may cause distortion in the arrangement of the discotic liquid crystal molecules 41. FIG. 5 is a cross-sectional view showing distortion in arrangement of discotic liquid crystal molecules in a polarizing plate according to the related art. In FIG. 5, when a heat is applied to a polarizing plate 30 (of FIG. 4), the arrangement of the discotic liquid crystal molecules 41 is distorted due to the stress generated by contraction of the polarizing layer 31 and expansion of the second support layer 33b. The degree of distortion in the arrangement of the discotic liquid crystal molecules 41 is proportional to the difference between the contractile force of the polarizing layer 31 and the expansive force of the second support layer 33b. Since the difference between contractile force of the polarizing layer 31 and expansive force of the second support layer 33b is maximized in edge portions of the polarizing plate 30, the distortion in the arrangement of the discotic liquid crystal molecules 41 is maximized in the edge portions. Accordingly, the polarizing plate 30 has a non-uniform polarization property throughout the whole display area, and degradation in the polarization property of the polarizing plate 30 is maximized in the edge portions of an LCD device.

SUMMARY OF THE INVENTION

A method of fabricating a polarizing plate for a liquid crystal display (LCD) device having an improved polarization property are described.

A method of fabricating a polarizing plate includes: providing a polarizing roll film having transmission axes; and cutting the polarizing roll film with a knife having a plurality of openings each having a rectangular shape to form a plurality of polarizing plates, the plurality of openings parallel to the transmission axes.

In another aspect, a method of fabricating a polarizing plate includes: swelling a raw film of large molecules; dyeing the raw film; stretching the raw film along a stretch direction; fixing the large molecules to form a polarizing roll film having transmission axes; forming first and second support layers on opposite surfaces of the polarizing roll film, respectively; and cutting the polarizing roll film having the first and second support layers with a knife having a plurality of openings each having a rectangular shape to form a plurality 3 of polarizing plates, the plurality of openings parallel to the transmission axes.

In another aspect, a method of fabricating a polarizing plate includes: forming a polarizing roll film; forming first and second support layers on opposite surfaces of the polarizing roll film, respectively; cutting the polarizing roll film having the first and second support layers to form a plurality of polarizing plates; aging the plurality of polarizing plates in a condition of a predetermined temperature and a predetermined humidity; and polishing the plurality of polarizing plates.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE ILLUSTRATED EMBODIMENTS

Reference will now be made in detail to embodiments which are illustrated in the accompanying drawings. Wherever possible, similar reference numbers will be used to refer to the same or similar parts.

Figure 1:
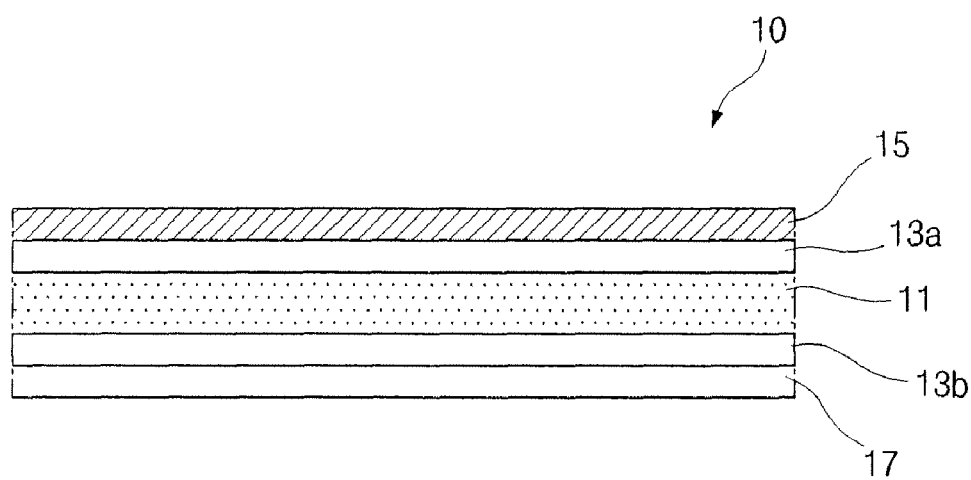
FIG. 1 is a cross-sectional view showing a polarizing plate according to the related art.
Figure 2:
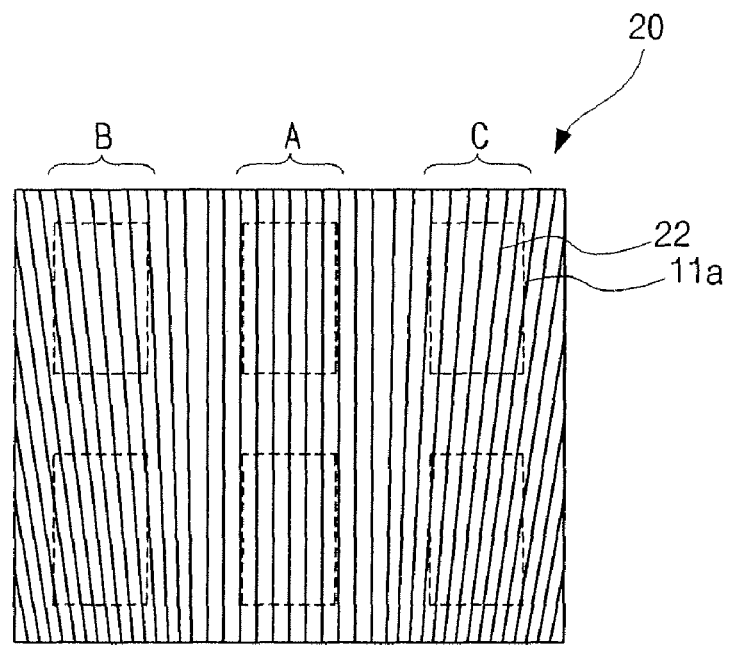
FIG. 2 is a plan view showing a transmission axis of a polarizing roll film according to the related art.
Figure 3:
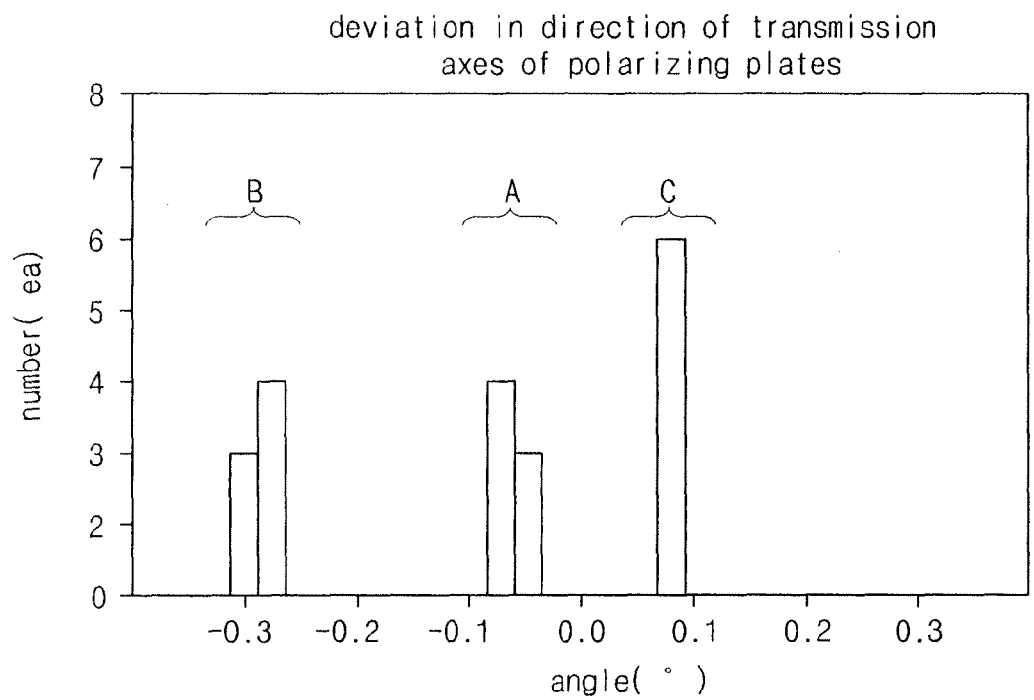
FIG. 3 is a histogram showing the deviation in the direction of transmission axes of polarizing plates according to the related art.
Figure 4:
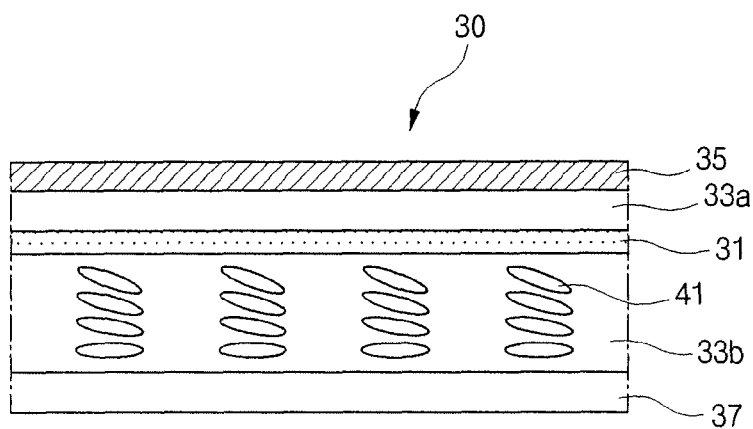
FIG. 4 is a cross-sectional view showing a polarizing plate using a discotic liquid crystal molecule according to the related art.
Figure 5:
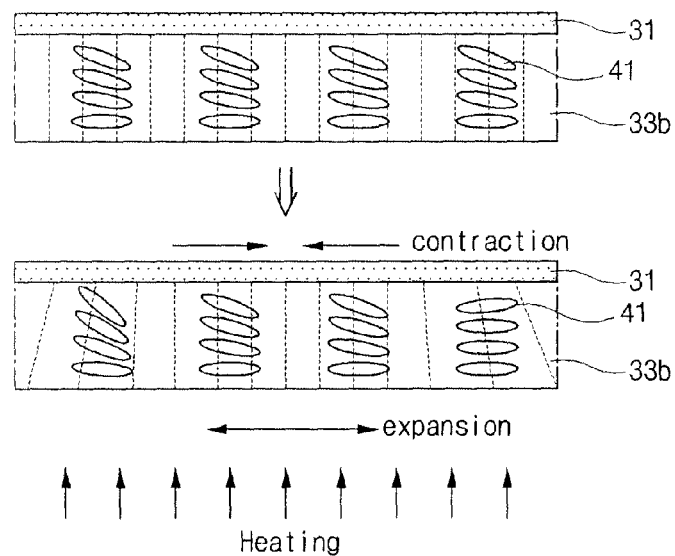
FIG. 5 is a cross-sectional view showing distortion in arrangement of discotic liquid crystal molecules in a polarizing plate according to the related art.
Figure 6:
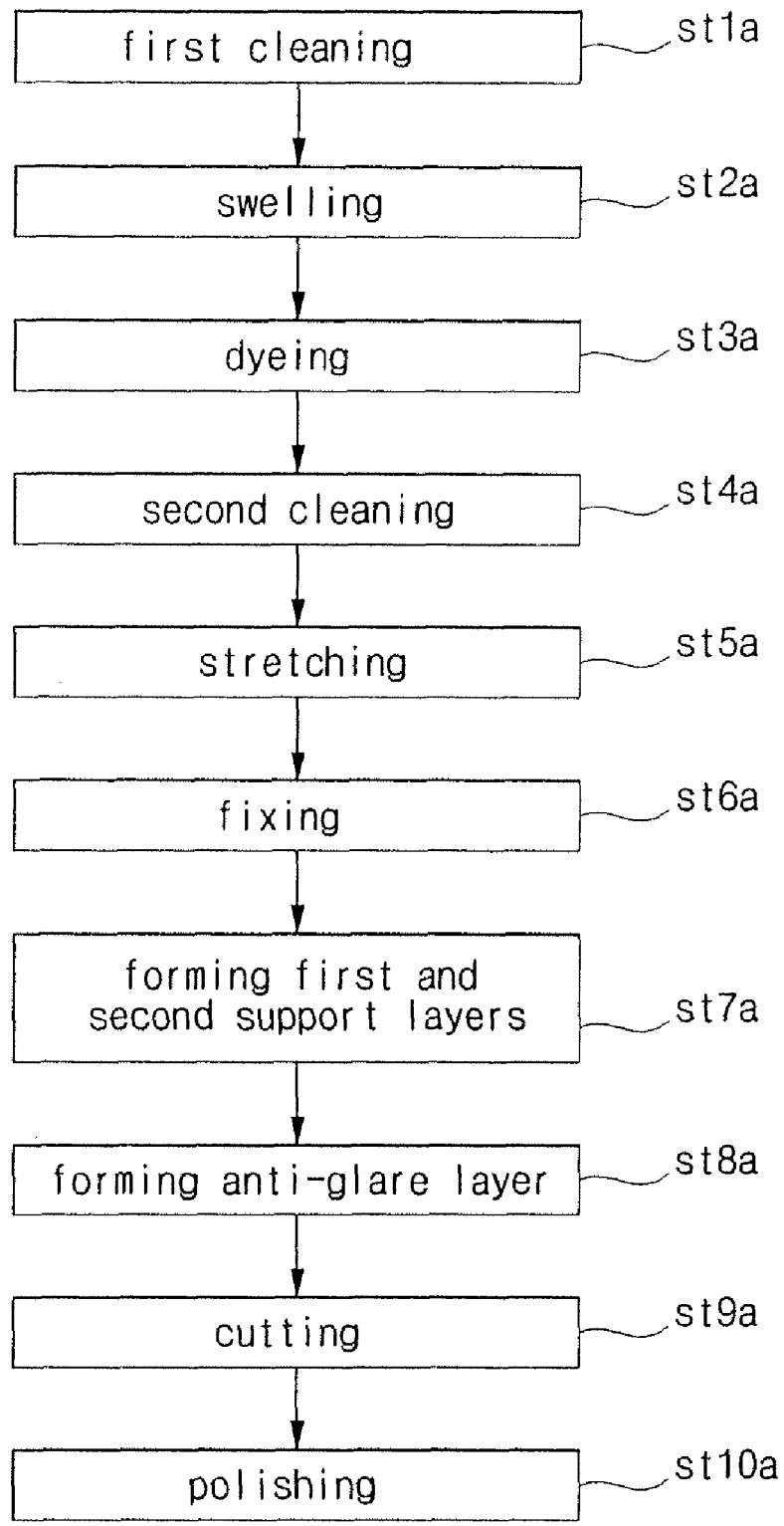
FIG. 6 is a flow chart showing a method of fabricating a polarizing plate according to a first embodiment of the present invention.

FIG. 6 is a flow chart showing a method of fabricating a polarizing plate according to a first embodiment of the present invention.

At a first step st1a, a raw film of large molecules such as polyvinyl alcohol (PVA) is cleaned first. At a second step st2a, the first cleaned raw film is dipped in a solution to be swelled. At a third step st3a, the swelled raw film is dyed with one of iodine ($I_2$) and dichroic dye. At a fourth step st4a, the dyed raw film is cleaned secondly. At a fifth step st5a, the secondly cleaned raw film is stretched along a stretch direction with a predetermined ratio so that molecules of the one of iodine ($I_2$) and dichroic dye are re-arranged along a direction substantially parallel to the stretch direction. For example, the secondly cleaned raw film may be wound on a roller through a solution of one of iodine ($I_2$) and dichroic dye in a bath for the stretching step. At a sixth step st6a, the re-arranged molecules are fixed to form a polarizing roll film. The swelling step, the dyeing step and the stretching step may be performed in any step order, and may be performed at the same time.

At a seventh step st7a, first and second support layers such as a tri-acetate cellulose (TAC) layer are formed on both surfaces of the polarizing roll film. The first and second support layers protect and support the polarizing roll film. At an eighth step st8a, an anti-glare layer is formed on one of the first and second support layers. The anti-glare layer prevents glare at the one of the first and second support layers. A hard coating layer or a sticking prevention layer may be further formed on the anti-glare layer, and one of the anti-glare layer, the hard coating layer and the sticking prevention layer may include a silica bead. At a ninth step st9a, the polarizing roll film having the first and second support layers and the anti-glare layer is cut into a plurality of polarizing plates. Since each polarizing plate has a rectangular shape that is aligned along a direction according to a position in the polarizing roll film, deviation in the direction of the transmission axes of the polarizing plates is minimized. At a tenth step st10a, the plurality of polarizing plates are polished to complete a fabrication process of a polarizing plate.

Figure 7:
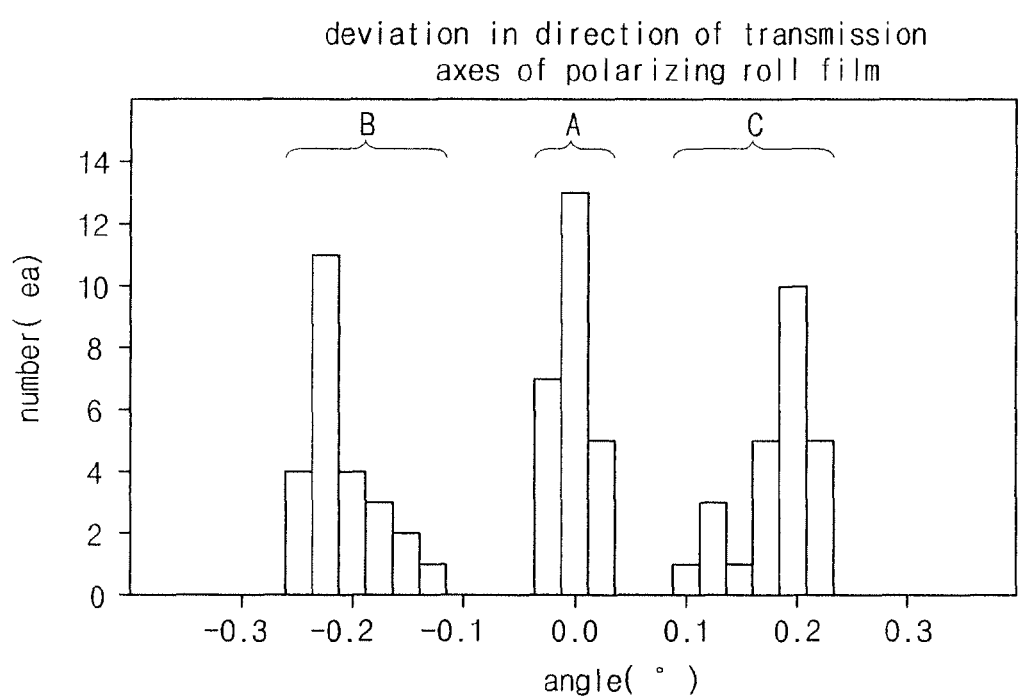
FIG. 7 is a histogram showing the deviation in the direction of transmission axes of a polarizing roll film according to a first embodiment of the present invention.

FIG. 7 is a histogram showing the deviation in the direction of the transmission axes of a polarizing roll film according to a first embodiment of the present invention.

In FIG. 7, transmission axes of a raw film are measured in central, left and right regions A, B and C of a raw film. The x-axis of the histogram represents an angle between a transmission axis of a polarizing roll film and a reference direction, and the y-axis of the histogram represents the numbers of measurement results having the corresponding angle. The reference direction is determined as a lengthwise direction of the polarizing roll film, i.e., the stretch direction of the polarizing roll film. As shown in FIG. 7, the polarizing roll film has the transmission axes of an angle between about −0.025° to about 0.025° in the central region A. In addition, the polarizing roll film has the transmission axes of an angle between about −0.25° to about −0.125° in the left region B, and the polarizing roll film has the transmission axes of an angle between about 0.1° to about 0.225° in the right region C. The transmission axes of the polarizing roll film are disposed along different directions according to a position on the polarizing roll film.

Although the transmission axes of the polarizing roll film have an angle spread in a range of about −0.25° to about 0.225°, the directions of the transmission axes of the polarizing roll film may be classified according to the regions in the polarizing roll film. The transmission axes in the central region A of the polarizing roll film are substantially parallel to the reference direction. In addition, by distortion and deformation due to a stress of the stretch process, the transmission axes in the left region B of the polarizing roll film substantially slant to the left with respect to the reference direction to have a negative angle, and the transmission axes in the right region C of the polarizing roll film substantially slant to the right with respect to the reference direction to have a positive angle. Accordingly, a polarizing plate having a uniform transmission axis is obtained by cutting the polarizing roll film along different directions based on the position in the polarizing roll film.

Figure 8A:
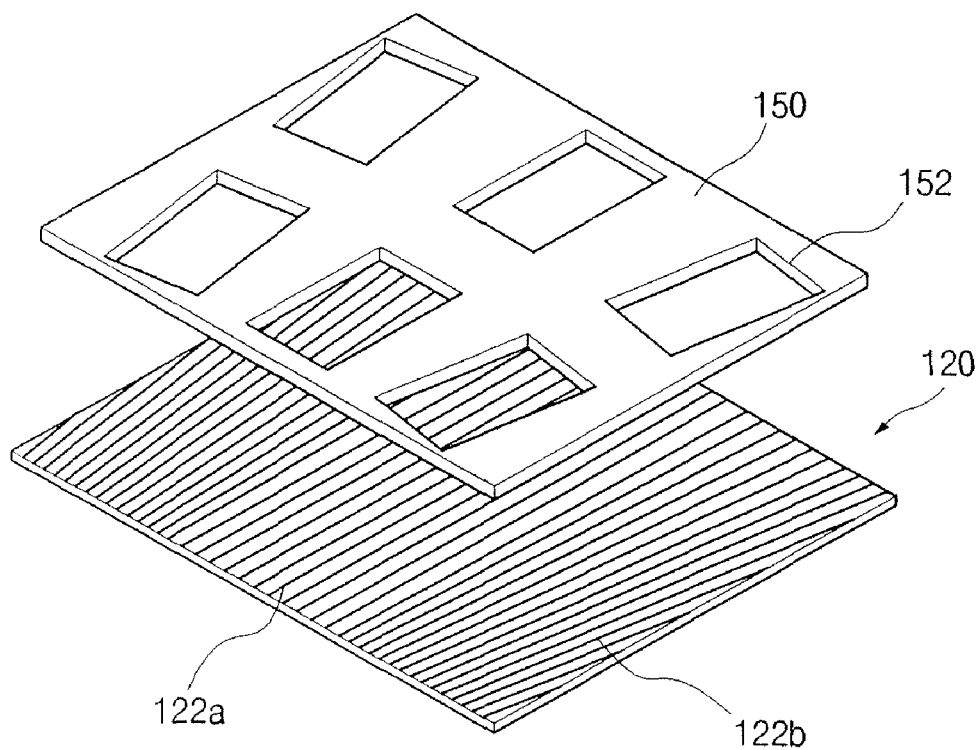
FIG. 8A is a perspective view showing a method of cutting a polarizing roll film with a knife according to a first embodiment of the present invention.
Figure 8B:
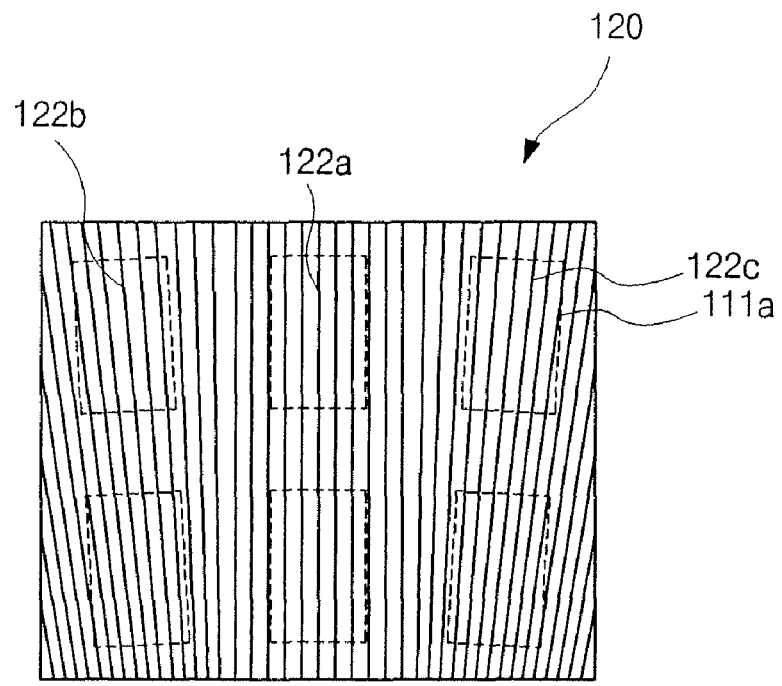
FIG. 8B is a plan view showing a method of cutting a polarizing film according to a first embodiment of the present invention.

FIG. 8A is a perspective view showing a method of cutting a polarizing roll film with a knife according to a first embodiment of the present invention and FIG. 8B is a plan view showing a method of cutting a polarizing film according to a first embodiment of the present invention.

In FIGS. 8A and 8B, a knife 150 is disposed over a polarizing roll film 120 having first and second support layers and an anti-glare layer. The knife 150 has a plate shape 1 including a plurality of openings 152. Each opening 152 of the knife 150 has a rectangular shape for a liquid crystal panel and corresponds to a polarizing plate area 111a of the polarizing roll film 120. Further, a blade (not shown) is formed along a boundary of each opening 152. The plurality of openings 152 are aligned differently according to a position A thereof in the polarizing roll film. For example, the opening 152 corresponding to the central region C may be aligned such that a lengthwise side of the rectangular shape is substantially parallel to the reference direction, i.e., the stretch direction. In addition, the opening 152 corresponding to the left region B may be aligned such that the lengthwise side of the rectangular shape slants to the left with respect to the reference direction, and the opening 152 corresponding to the right region C may be aligned such that the lengthwise side of the rectangular shape slants to the right with respect to the reference direction. Accordingly, the plurality of openings 152 are disposed along different directions according to a position on the polarizing roll film so that the plurality of openings 152 are substantially parallel to the transmission axes.

Since the first transmission axes 122a in the central region A of the roll film 120 are substantially parallel to the reference direction, the lengthwise sides of the opening 152 corresponding to the central region A are parallel to the first transmission axes 122a. In addition, since the second transmission axes 122b in the left region B of the polarizing roll film 120 substantially slant to the left with respect to the reference direction, the lengthwise sides of the opening 152 corresponding to the left region B are substantially parallel to the second transmission axes 122b. Similarly, since the third transmission axes 122c in the right region C of the polarizing roll film 120 substantially slant to the right with respect to the reference direction, the lengthwise sides of the opening 152 corresponding to the right region C are substantially parallel to the third transmission axes 122c. As a result, the plurality of openings 152 are disposed such that the lengthwise sides of each opening 152 are substantially parallel to the transmission axes 122a, 122b and 122c in all the central, left and right regions A, B and C of the polarizing roll film 120.

Further, slant angles of the openings corresponding to the left (B) and right (C) regions may be determined by an average of the transmission axes 122b and 122c in the left and right regions, B and C. For example, the opening 152 corresponding to the left region B may be aligned such that the lengthwise side of the opening 152 is substantially parallel to a middle transmission axis of the second transmission axes 122b, and the opening 152 corresponding to the right region C may be aligned such that the lengthwise side of the opening 152 is substantially parallel to a middle transmission axis of the third transmission axes 122c. After the knife 150 is aligned, the polarizing roll film 120 having first and second support layers and an anti-glare layer is cut with the knife 150 to form a plurality of polarizing plates.

Figure 9:
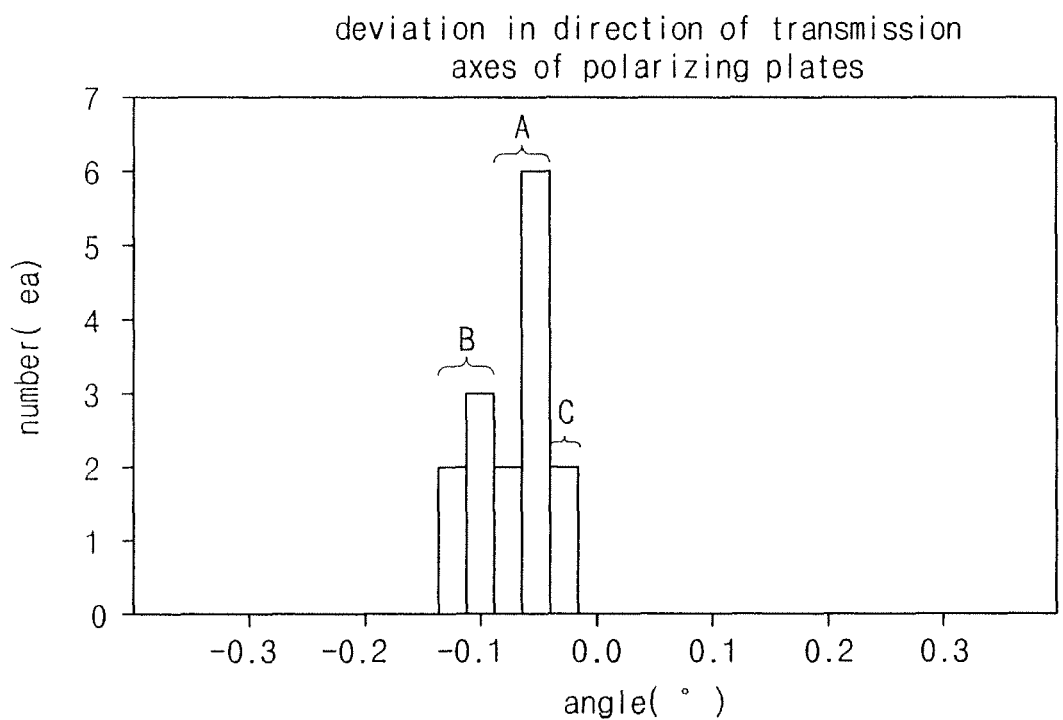
FIG. 9 is a histogram showing the deviation in the direction of transmission axes of polarizing plates according to a first embodiment of the present invention.

FIG. 9 is a histogram showing the deviation in the direction of the transmission axes of polarizing plates according to a first embodiment of the present invention.

In FIG. 9, transmission axes of polarizing plates are measured according to central, left and right regions A, B and C (of FIGS. 8A and 8B) of a polarizing roll film 120 (of FIGS. 8A and 8B). The x-axis of the histogram represents an angle between a transmission axis of a polarizing plate and a reference direction, and the y-axis of the histogram represents the numbers of polarizing plates having the corresponding angle. The reference direction is determined as a lengthwise direction of the polarizing plates, which is the same as a lengthwise direction of the polarizing roll film 120. The polarizing plates in the central region A have the transmission axes of an angle between about −0.075° to about −0.05°. In addition, the polarizing plates in the left region B have the transmission axes of an angle between about −0.125° to about −0.11, and the polarizing plates in the right region C have the transmission axes of an angle of about −0.025°. As a result, transmission axes of the polarizing plates have an angle between about −0.125° to about −0.025° with respect to the reference direction, and the polarizing plates have relatively small deviation, a range width of about 0.1°, in direction of the transmission axes. Accordingly, each of the polarizing plates has a uniform transmission axis regardless of the position in the polarizing roll film 120, and contrast ratio and polarization property of an LCD device using the polarizing plates are improved.

Figure 10:
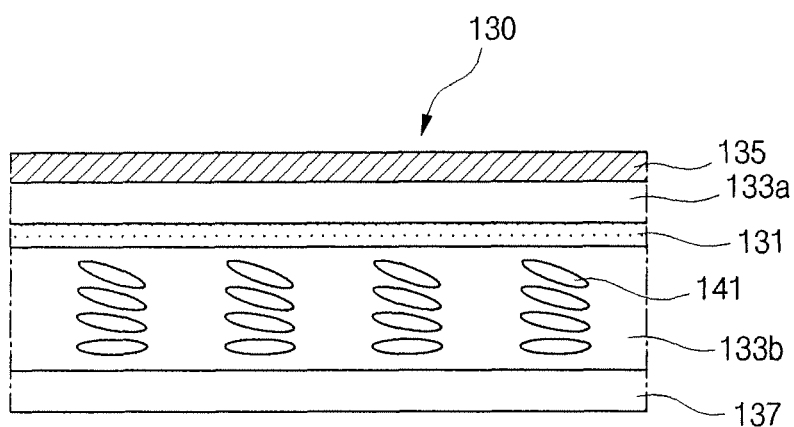
FIG. 10 is a cross-sectional view showing a polarizing plate fabricated by a method according to a second embodiment of the present invention.

FIG. 10 is a cross-sectional view showing a polarizing plate fabricated by a method according to a second embodiment of the present invention.

In FIG. 10, a polarizing plate 130 includes a polarizing layer 131, a first support layer 133a on one surface of the polarizing layer 130, a second support layer 133b on the other surface of the polarizing layer 131, an anti-glare layer 135 on the first support layer 133a and an adhesive layer 137 on the second support layer 133b. Although not shown in FIG. 10, a hard coating layer for protecting the polarizing plate 130 and a sticking prevention layer for preventing sticking to adjacent layers may be further formed on the anti-glare layer 135.

The second support layer 133b includes discotic liquid crystal molecules 141 arranged in a hybrid type for improving viewing angle. The second support layer 133b of a tri-acetate cellulose (TAC) film including discotic liquid crystal molecules 141 may be referred to as a WA (wide view)-TAC film and function as a retardation film. Accordingly, retardation of the second support layer 133b is greater than retardation of the first support layer 133a.

The polarizing layer 131 is formed by stretching a raw film of large molecules such as polyvinyl alcohol (PVA) dyed with one of iodine ($I_2$) and dichroic dye. Accordingly, the polarizing layer 131 has a transmission axis so that only light parallel to the transmission axis can pass through the polarizing layer 131.

Since the polarizing plate 130 has a flat surface, light with a specific incident angle may reflect with a specific reflection angle to cause a glare at a specific viewing angle. The anti-glare layer 135 including a silica bead (not shown) as a light diffuser prevents the glare by scattering the incident light.

Figure 11:
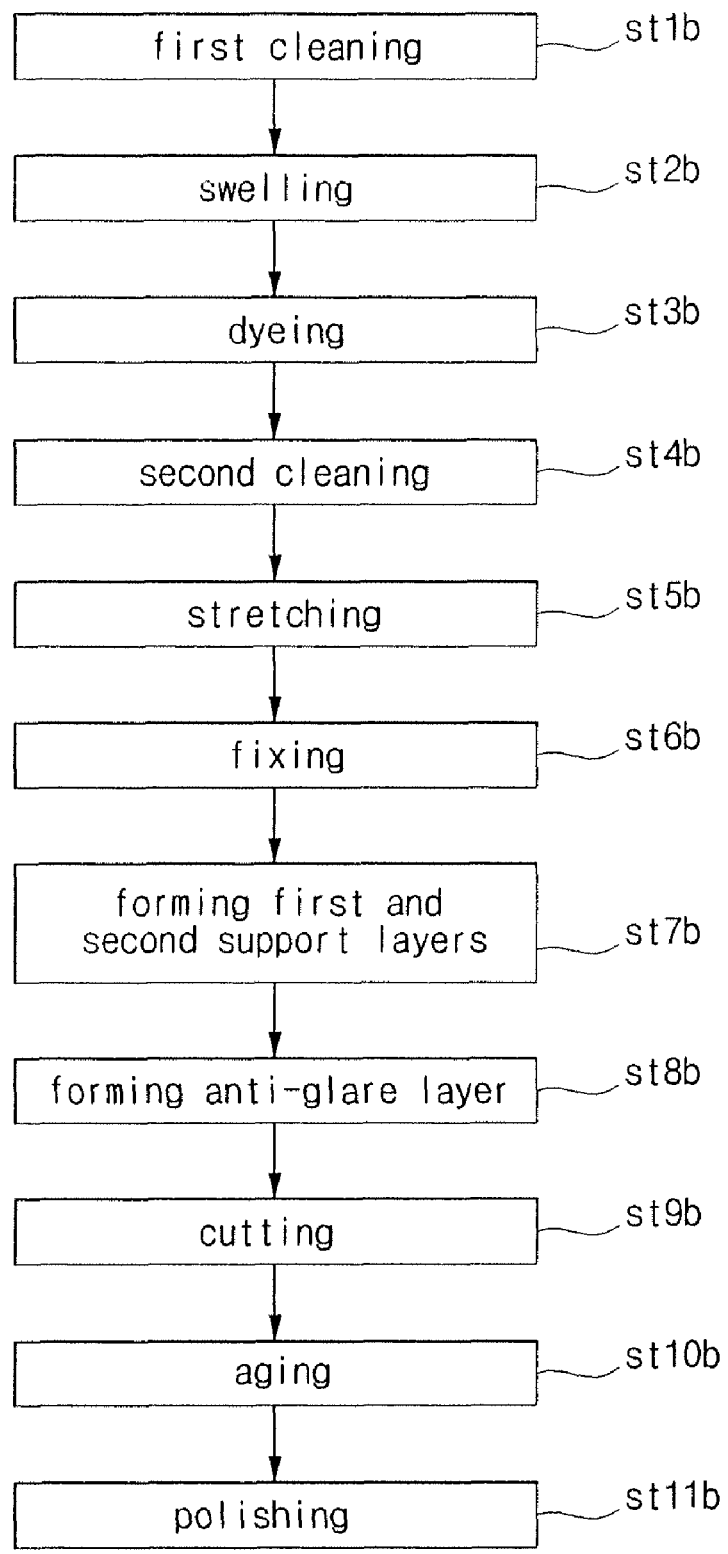
FIG. 11 is a flow chart showing a method of fabricating a polarizing plate according to a second embodiment of the present invention.

In addition, since the fabrication process of the polarizing plate 130 includes an aging step, the polarizing layer 131 is insensitive to heat. FIG. 11 is a flow chart showing a method of fabricating a polarizing plate according to a second embodiment of the present invention.

At a first step st1b, a raw film of large molecules such as polyvinyl alcohol (PVA) is cleaned first. At a second step st2b, the first cleaned raw film is dipped in a solution to be swelled. At a third step st3b, the swelled raw film is dyed with one of iodine ($I_2$) and dichroic dye. At a fourth step st4b, the dyed raw film is cleaned secondly. At a fifth step st5b, the secondly cleaned raw film is stretched along a stretch direction with a predetermined ratio so that molecules of the one of iodine ($I_2$) and dichroic dye are re-arranged along a direction parallel to the stretch direction. The secondly cleaned raw film may be wound on a roller through a solution of one of iodine ($I_2$) and dichroic dye in a bath. At a sixth step st6b, the re-arranged molecules are fixed to form a polarizing roll film. The swelling step, the dyeing step and the stretching step may be performed in any step order, and may be performed at the same time.

At a seventh step st7b, first and second support layers such as a tri-acetate cellulose (TAC) layer are formed on both surfaces of the polarizing roll film. The first and second support layers protect and support the polarizing roll film. At an eighth step st8b, an anti-glare layer is formed on one of the first and second support layers. The anti-glare layer prevents glare at the one of the first and second support layers. A hard coating layer or a sticking prevention layer may be further formed on the anti-glare layer, and one of the anti-glare layer, the hard coating layer and the sticking prevention layer may include a silica bead. At a ninth step st9b, the polarizing roll film having the first and second support layers and the anti-glare layer is cut into a plurality of polarizing plates.

At a tenth step st10b, the plurality of polarizing plates 130 (of FIG. 10) are aged in a condition of high temperature and high humidity. For example, the plurality of polarizing plates may be kept in a temperature of about 40° C. to about 50° C., a humidity of about 60% to about 80% for about 5 days to about 7 days. The polarizing layer 131 (of FIG. 10) contracts due to heat during the aging step, while the first and second support layers 133a and 133b (of FIG. 10) expand due to heat during the aging step. The contraction of the polarizing layer 131 is irreversible and the expansion of the first and second support layers 131a and 131b is reversible. Accordingly, after the aging step, the first and second support layers 131a and 131b are restored to an original state so that the first and second support layers 131a and 131b can contract to have an original size. However, the polarizing layer 131 does not expand and a shrunk size of the polarizing layer 131 is maintained even after the aging step. In addition, since the polarizing layer 131 is aged with the heat, the polarizing layer 131 on an LCD device does not contract even when heat is applied to the LCD device. At an eleventh step st11b, the plurality of polarizing plates are polished to complete a fabrication process of a polarizing plate.

The polarizing plate 130 is applied to an LCD device such that the adhesive layer 137 (of FIG. 10) is attached to a liquid crystal panel (not shown). Since the polarizing layer 131 of the polarizing plate 130 is insensitive to heat, the polarizing layer 131 does not contract and expand even when heat is applied. When the polarizing plate 130 is heated, the polarizing layer 131 does not contract and only the first and second support layers 131a and 131b expand. As a result, a stress between the polarizing layer 131 and each of the first and second support layers 131a and 131b is reduced and minimized, and a polarization property of the polarizing plate 130 is improved. Further, distortion in arrangement of discotic liquid=crystal molecules 141 (of FIG. 10) in the second support layer 131b is reduced and minimized. Accordingly, the display quality of the LCD device is improved.

Figure 12:
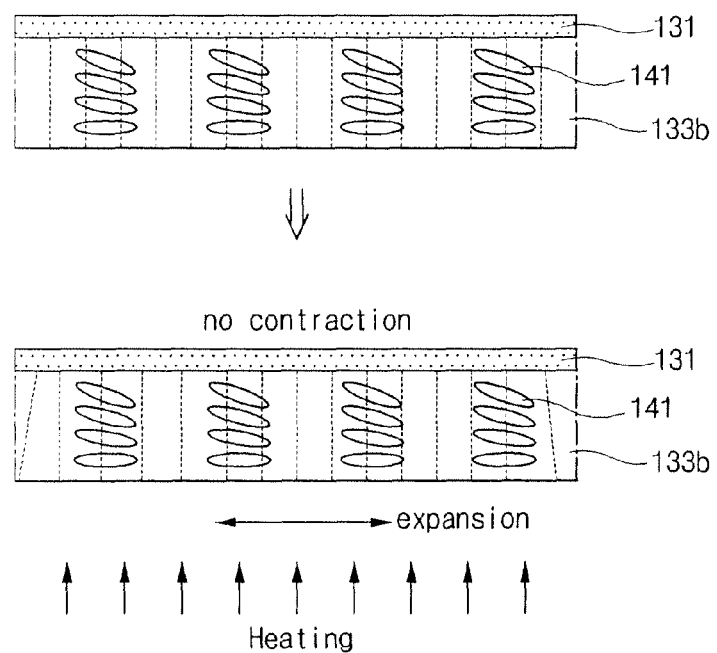
FIG. 12 is a cross-sectional view showing the distortion in the arrangement of discotic liquid crystal molecules in a polarizing plate according to a second embodiment of the present invention.

FIG. 12 is a cross-sectional view showing the distortion in the arrangement of discotic liquid crystal molecules in a polarizing plate according to a second embodiment of the present invention.

In FIG. 12, since the polarizing layer 131 does not contract even when a heat is applied, a stress generated by contraction of the polarizing layer 131 and expansion of the second support layer 133b is reduced and minimized. Since the degree of distortion in the arrangement of the discotic liquid crystal molecules 141 is proportional to the difference between the contractile force of the polarizing layer 131 and the expansive force of the second support layer 133b, distortion in the arrangement of the discotic liquid crystal molecules 141 is also reduced and minimized. Accordingly, the polarizing plate 130 (of FIG. 10) has a uniform polarization property throughout the substantially whole display area, and degradation of the polarization property in edge portions of an LCD device is prevented.

Although not shown, a fabrication process of a polarizing plate according to the second embodiment of the present invention may include a cutting step according to the first embodiment of the present invention. Accordingly, a polarizing roll film having first and second support layers and an anti-glare layer may be cut with a knife including a plurality of openings differently aligned according to a position thereof to form a plurality of polarizing plates, and the plurality of polarizing plates may be aged in a condition of high temperature and high humidity.

Figure 13:
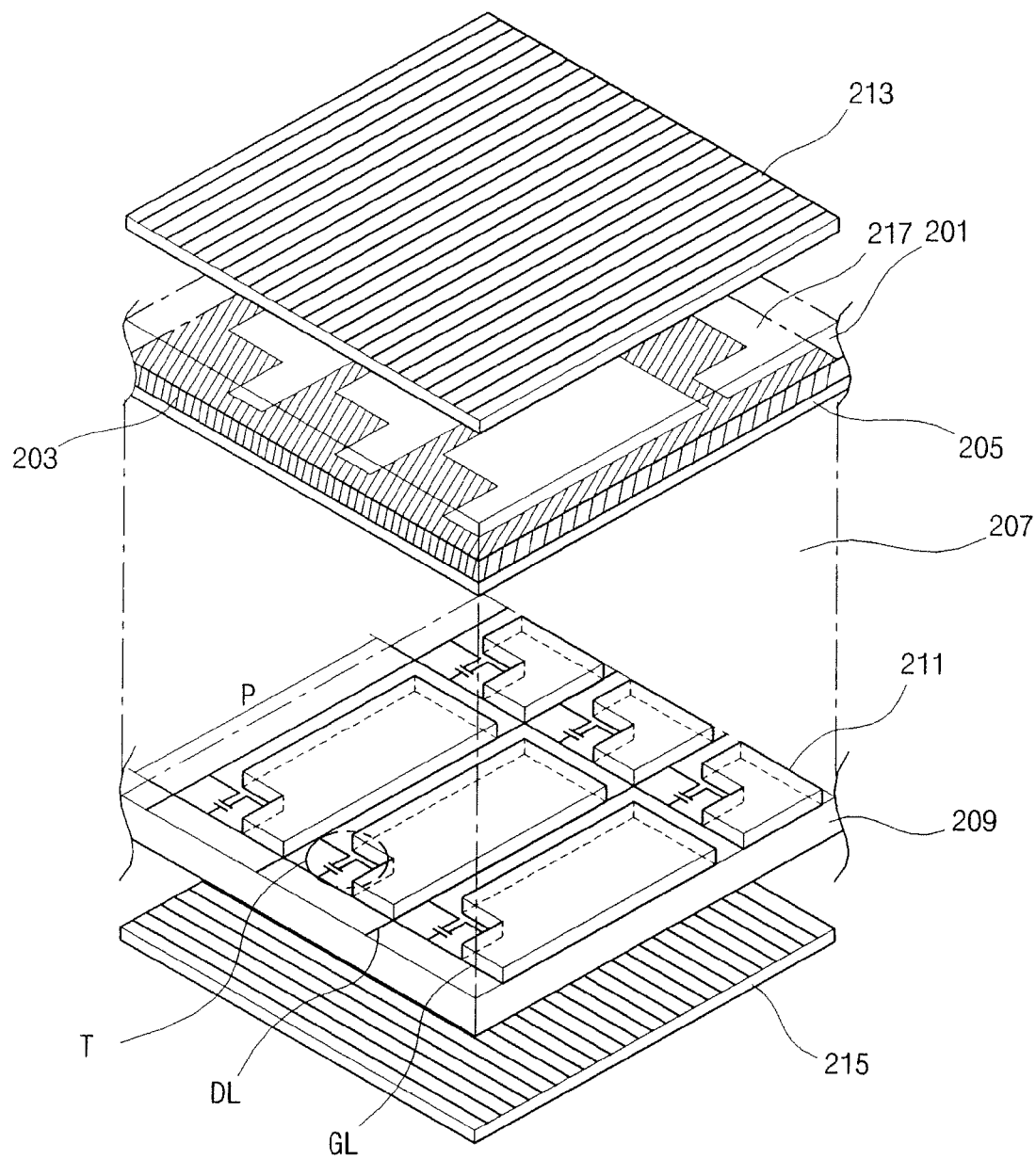
FIG. 13 is an exploded perspective view of an LCD device including a polarizing plate according to a third embodiment of the present invention.

FIG. 13 is an exploded perspective view of an LCD device including a polarizing plate according to a third embodiment of the present invention. For illustration, it is assumed that the LCD device is driven in a twisted nematic (TN) mode.

In FIG. 13, first and second substrates 209 and 201 face into and are spaced apart from each other. A gate line GL and a data line DL are formed on an inner surface of the first substrate 209. The gate line GL and the data line DL cross each other to define a pixel region P. A thin film transistor (TFT) T is connected to the gate line GL and the data line DL. A pixel electrode 211 connected to the TFT T is formed in the pixel region P. A black matrix 203 having openings is formed on an inner surface of the second substrate 201. A color filter layer 217 is formed in the openings of the black matrix 203. A common electrode 205 is formed on an entire surface of the second substrate 201 having the black matrix 203 and the color filter layer 217. A liquid crystal layer 207 is formed between the first and second substrates 209 and 201. In addition, a first polarizing plate 215 is formed on an outer surface of the first substrate 209 and a second polarizing plate 213 is formed on an outer surface of the second substrate 201. For example, the first and second polarizing plates 215 and 213 may be disposed such that transmission axes of the first and second polarizing plates 215 and 213 are substantially perpendicular to each other. Since each of the first and second polarizing plates 215 and 213 is fabricated by a method including at least one of a cutting step using a knife and an aging step of FIG. 11, each of the first and second polarizing plates 215 and 213 has a uniform polarization property.

A voltage is applied to the pixel electrode 211 and the common electrode 205 for displaying a black image in the TN mode LCD device displays, and an electric field is generated between the pixel electrode 211 and the common electrode 205. In addition, liquid crystal molecules in the liquid crystal layer 207 are aligned according to the electric field. Light from a backlight unit (not shown) is polarized while passing through the first polarizing plate 215. The polarized light has a polarization axis parallel to a transmission axis of the first polarizing plate 215. The polarized light passes through the liquid crystal layer 207 without change of the polarization axis. As a result, the polarized light that has passed through the liquid crystal layer 207 is blocked by the second polarizing plate 213 having a transmission axis substantially perpendicular to the transmission axis of the first polarizing plate 215, i.e., the polarization axis of the polarized light, and the LCD device displays a black image.

When a voltage is not applied to the pixel electrode 211 and the common electrode 205 for displaying a white image in the TN mode LCD device, light from the backlight unit is polarized while passing through the first polarizing plate 215, and the polarized light has a polarization axis parallel to a transmission axis of the first polarizing plate 215. The polarization axis of the polarized light is rotated by about 90° while passing through the liquid crystal layer 207. Accordingly, the polarized light that has passed through the liquid crystal layer 207 is transmitted through the second polarizing plate 213 having the transmission axis substantially parallel to the rotated polarization axis.

Consequently, in a method of fabricating a polarizing plate according to the present invention, since a polarizing roll film is cut along transmission axes having deviation, a polarizing plate has a uniform transmission axis and a polarization property of the polarizing plate is improved. As a result, display quality such as contrast ratio of an LCD device having the polarizing plate is improved. In addition, since a polarizing plate is aged before completing a fabrication process, the polarizing plate is insensitive to heat and distortion of the polarizing plate is reduced. As a result, deterioration such as light leakage and deviation in brightness of an LCD device having the polarizing plate are prevented.

It will be apparent to those skilled in the art that various modifications and variations can be made in a method of fabricating a polarizing plate of the present invention without departing from the spirit or scope of the invention. Thus, it is intended that the present invention cover the modifications and variations of this invention provided they come within the scope of the appended claims and their equivalents.

What is claimed is:

1. A method of fabricating a polarizing plate, comprising:
swelling a raw film of large molecules;
dyeing the raw film;
stretching the raw film along a stretch direction;
fixing the large molecules to form a polarizing roll film having transmission axes, wherein the transmission axes in a central region of the polarizing roll film are parallel to a lengthwise direction of the polarizing roll film, and wherein the transmission axes in a left region of the polarizing roll film are slant in a left direction with respect to the lengthwise direction of the polarizing roll film and the transmission axes in a right region of the polarizing roll film is slant in a right direction with respect to the lengthwise direction of the polarizing roll film;
forming first and second support layers on opposite surfaces of the polarizing roll film, respectively;
forming one of an anti-glare layer, a hard coating layer and a sticking prevention layer on the first support layer, the one of the anti-glare layer, the hard coating layer and the sticking prevention layer including a silica bead;
cutting the polarizing roll film having the first and second support layers and the one of the anti-glare layer, the hard coating layer and the sticking prevention layer with a knife having first to third openings each having a rectangular shape to form first to third polarizing plates, the plurality of openings are parallel to the transmission axes; and aging the first to third polarizing plates in a condition of a predetermined temperature within a range of about 40° C. to less than 50° C. and a predetermined humidity within a range of about 60% to about 80, wherein the first opening of the knife corresponding to the central region are disposed such that a lengthwise side of the first opening is parallel to the lengthwise direction of the polarizing roll film, and wherein the second opening of the knife corresponding to the left region are disposed such that the lengthwise side of the second opening is slant to the left with respect to the lengthwise direction of the polarizing roll film, and the third opening of the knife corresponding to the right region are disposed such that the lengthwise side of the third opening is slant to the right with respect to the lengthwise direction.

2. A method of fabricating a polarizing plate, comprising:

forming a polarizing roll film having transmission axes, wherein the transmission axes in a central region of the polarizing roll film are parallel to a lengthwise direction of the polarizing roll film, and wherein the transmission axes in a left region of the polarizing roll film are slant in a left direction with respect to the lengthwise direction of the polarizing roll film and the transmission axes in a right region of the polarizing roll film is slant in a right direction with respect to the lengthwise direction of the polarizing roll film;

forming first and second support layers on opposite surfaces of the polarizing roll film, respectively;

forming one of an anti-glare layer, a hard coating layer and a sticking prevention layer on the first support layer, the one of the anti-glare layer, the hard coating layer and the sticking prevention layer including a silica bead;

cutting the polarizing roll film having the first and second support and the one of anti-glare layer, the hard coating layer and the sticking prevention layer with a knife having first to third openings each having a rectangular shape to form first to third polarizing plates;

aging the first to third polarizing plates in a condition of a predetermined temperature within a range of about 40° C. to less than 50° C. and a predetermined humidity within a range of about 60% to about 80; and polishing the first to third polarizing plates, wherein the first opening of the knife corresponding to the central region are disposed such that a lengthwise side of the first opening is parallel to the lengthwise direction of the polarizing roll film, and wherein the second opening of the knife corresponding to the left region are disposed such that the lengthwise side of the second opening is slant to the left with respect to the lengthwise direction of the polarizing roll film, and the third opening of the knife corresponding to the right region are disposed such that the lengthwise side of the third opening is slant to the right with respect to the lengthwise direction.

3. The method according to claim 2, wherein the polarizing roll film is aged for about 5 days to about 7 days such that the polarizing roll film irreversibly contracts.

4. The method according to claim 2, wherein forming the polarizing roll film comprises:

swelling a raw film of large molecules;

dyeing the raw film;

stretching the raw film along a stretch direction; and fixing the large molecules of the raw film.

* * * * *